United States Patent [19]
Scott et al.

[11] 3,887,488
[45] June 3, 1975

[54] INHIBITION OF CORROSION IN SULFURIC ACID SOLUTIONS

[75] Inventors: Robert H. Scott, Corpus Christi; Dan L. Gaulding, Driscoll, both of Tex.

[73] Assignee: Celanese Corporation, New York, N.Y.

[22] Filed: June 26, 1974

[21] Appl. No.: 483,167

Related U.S. Application Data

[63] Continuation-in-part of Ser. No. 232,939, March 8, 1972, abandoned, which is a continuation-in-part of Ser. No. 825,070, May 15, 1969, abandoned.

[52] U.S. Cl............ 252/389 A; 21/2.7 R; 21/2.7 A; 252/147; 252/387
[51] Int. Cl....... C23f 11/04; C23g 1/04; C23g 1/06
[58] Field of Search........................ 21/2.7 A, 2.7 R; 252/389 A, 8.55 R, 8.55 B, 8.55 C, 87, 146, 147, 181, 387

[56] References Cited
UNITED STATES PATENTS

| | | | |
|---|---|---|---|
| 1,903,041 | 3/1933 | Hall et al. | 210/57 |
| 2,515,529 | 7/1950 | Ryznar et al. | 21/2.7 R |
| 2,650,156 | 8/1953 | Shelton-Jones | 21/2.7 R |
| 2,901,438 | 8/1959 | Rogers | 252/387 |
| 2,990,374 | 6/1961 | Schwartz | 252/136 |
| 3,044,854 | 1/1960 | Young | 23/165 |
| 3,077,381 | 2/1963 | Bergsteinsson | 23/165 |
| 3,114,657 | 12/1963 | Stilwell | 134/28 |
| 3,389,059 | 6/1968 | Goeloner | 210/57 |
| 3,416,974 | 12/1968 | Scott | 148/6.15 |
| 3,510,432 | 5/1970 | Squire | 252/148 |
| 3,607,781 | 9/1971 | Kaneko | 252/389 A |

OTHER PUBLICATIONS

Shreve, Chemical Process Industries 3rd. Ed., McGraw Hill, New York, N.Y. 1967, pp. 270–277.

*Primary Examiner*—Benjamin R. Padgett
*Assistant Examiner*—B. Hunt
*Attorney, Agent, or Firm*—Stewart N. Rice; Ralph M. Pritchett

[57] ABSTRACT

The corrosion of metal surfaces by aqueous sulfuric acid is inhibited by incorporating into the latter a phosphorus compound having a phosphorus atom linked to an unshared oxygen atom. The phosphorus compound, e.g., orthophosphoric acid, is used in amounts ranging from 1 to 10,000 p.p.m. based on the weight of the aqueous sulfuric acid.

12 Claims, No Drawings

INHIBITION OF CORROSION IN SULFURIC ACID SOLUTIONS

CROSS-REFERENCE TO RELATED APPLICATION

This is a continuation-in-part of application Ser. No. 232,939 filed Mar. 9, 1972, and now abandoned which in turn is a continuation-in-part of application Ser. No. 825,070 filed May 15, 1969 and now abandoned.

BACKGROUND OF THE INVENTION

This invention relates to the protection of metals against corrosion by aqueous sulfuric acid solutions. More particularly, it relates to inhibition of the corrosive properties of aqueous sulfuric acid by incorporating certain inhibitors thereinto.

Aqueous solutions of sulfuric acid are widely used in industry, and one of the biggest problems in handling these solutions is corrosion. Even when the solutions are very dilute, containing only parts per million of sulfuric acid, they can cause destruction of equipment used to handle them. Corrosion-resistant materials are known for handling these sulfuric acid solutions, but these materials are generally very expensive or else mechanically fragile. Thus it would be desirable to have an effective method of inhibiting corrosion by these aqueous sulfuric acid solutions so that ordinary materials of construction would be less affected.

It is accordingly an object of the present invention to minimize the deterioration of metals such as stainless steel which are in contact with aqueous sulfuric acid solutions. It is a further object to provide a method for rendering aqueous sulfuric acid solutions less corrosive by incorporating into them certain additives which have been found to function effectively as corrosion inhibitors in such solutions. These and other objects as well as a fuller understanding of the invention can be had by reference to the following detailed description and the appended claims.

SUMMARY OF THE INVENTION

The above objects are accomplished according to the present invention, which, in one of its aspects, comprises incorporating into an aqueous sulfuric acid solution from 1 to 10,000 parts per million (hereinafter abbreviated "p.p.m.") of a soluble phosphorus compound having at least one phosphorus atom which is linked to an unshared oxygen atom. That is, the phosphorus must be linked to an oxygen atom by a double bond as in those compounds having a

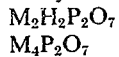

radical. The types of compounds which are desirable include the oxy acids of phosphorus, salts of the oxy acids of phosphorus, esters of the oxy acids of phosphorus, and oxides of phosphorus.

Oxy acids of phosphorus suitable for use according to the present invention are orthophosphoric acid ($H_3PO_4$), pyrophosphoric acid ($H_4P_2O_7$), orthophosphorous acid ($H_2(HPO_3)$) and hypophosphorous acid ($H(H_2PO_2)$).

Of the oxy acids of phosphorus, orthophosphoric acid and pyrophosphoric acid are preferred, with orthophosphoric acid being especially preferred because of its low cost and ease of handling.

Salts of the oxy acids of phosphorus which are suitable for use in the present invention are the various alkali metal (lithium, sodium, potassium, cesium), alkaline earth metal (beryllium, magnesium, calcium, strontium, barium) and ammonium (primary, secondary, tertiary and quarternary alkyl, e.g., methyl) salts of the aforementioned oxy acids.

Alkali metal salts of orthophosphoric acid suitable for use in the present invention can be represented by any of the following formulas:

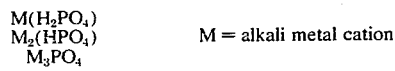

$M(H_2PO_4)$
$M_2(HPO_4)$     M = alkali metal cation
$M_3PO_4$

This general formula is intended to include the various possible hydrated forms of alkali metal salts of orthophosphoric acid. This interpretation applies as well to the other general formulas for the salts of oxy acids of phosphorous appearing hereinbelow. Examples of alkali metal salts of orthophosphoric acid are monopotassium orthophosphate ($KH_2PO_3$), dipotassium orthophosphate ($K_2HPO_3$) and trisodium orthophosphate ($Na_3PO_3$). Alkaline earth metal salts of orthophosphoric acid can be represented by any of the following three formulas:

$M'(H_2PO_4)_2$
$M'HPO_4$
$M'_3(PO_4)_2$ wherein M' represents an alkaline earth metal cation. Examples of such salts are calcium monoorthophosphate ($Ca(H_2PO_4)_2$), barium diorthophosphate ($BaHPO_4$), and magnesium triorthophosphate ($Mg_3)PO_4)_2$).

Of the salts of orthophosphoric acid suitable for use in the present invention, the alkali metal salts are preferred. Among these alkali metal salts, monopotassium orthophosphate and trisodium orthophosphate are especially preferred.

Alkali metal salts of pyrophosphoric acid which are suitable for use in the present invention can be represented by either of the following two formulas:

$M_2H_2P_2O_7$
$M_4P_2O_7$

Examples of such salts are dipotassium pyrophosphate ($K_2H_2P_2O_7$) and tetrasodium pyrophosphate ($Na_4P_2O_7$). Alkaline earth metal salts of pyrophosphoric acid can be represented by either of the following two formulas:

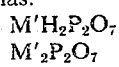

$M'H_2P_2O_7$
$M'_2P_2O_7$

Examples of such salts are calcium pyrophosphate and dimagnesium pyrophosphate.

Of the salts of pyrophosphoric acid which are suitable for use in the present invention, the alkali metal salts are preferred. Among these alkali metal salts, tetrasodium pyrophosphate is especially preferred.

In addition to the aforementioned metal salts of orthophosphoric acid, the salts, and particularly the alkali metal salts, of higher polyphosphoric acids are also suitable for use according to the present invention. An especially preferred alkali metal salt of a polyphosphoric acid is sodium tripolyphosphate, which has the formula $Na_5P_3O_{10}$.

Alkali metal salts of orthophosphorous acid suitable for use in the present invention can be represented by either of the following formulas:

MH(HPO$_3$)
M$_2$(HPO$_3$)

Examples of such salts are monosodium orthophosphite (NaH(HPO$_3$)) and disodium orthophosphite (Na$_2$(HPO$_3$)). Alkaline earth metal salts of orthophosphorous acid suitable for use in the present invention can be represented by either of the following formulas:

M'[H(HPO$_3$)]$_2$
M'(HPO$_3$)

Examples of such salts are magnesium monoorthophosphite (Mg(H(HPO$_3$)$_2$) and calcium diorthophosphite (Ca(HPO$_3$)).

Of the salts of orthophosphorous acid suitable for use in the present invention, the alkali metal salts are preferred. Among these alkali metal salts, monosodium orthophosphite is especially preferred.

Alkali metal salts of hypophosphorous acid suitable for use in the present invention can be represented by the following formula:

MH$_2$PO$_2$

Examples of such salts are sodium hypophosphite (NaH$_2$PO$_2$) and potassium hypophosphite (KH$_2$PO$_2$). Alkaline earth metal salts of hypophosphorous acid can be represented by the following formula:

M'(H$_2$PO$_2$)$_2$

Examples of such salts are magnesium hypophosphite (Mg(H$_2$PO$_2$)$_2$) and calcium hypophosphite (Ca(H$_2$PO$_2$)$_2$).

Of the salts of hypophosphorous acid which are suitable for use in the present invention, the alkali metal salts are preferred. Among these alkali metal salts, sodium hypophosphite is especially preferred.

Esters of the oxy acids of phosphorus which are suitable for use in the present invention are those wherein the organic moieties contain from 1 to 20 carbon atoms and which are soluble in aqueous sulfuric acid to the extent of between 1 and 10,000 parts per million based on the weight of the aqueous sulfuric acid. The organic moieties can be aromatic or aliphatic (including branched and straight-chain, saturated or unsaturated aliphatic) and preferably contain from 1 to 7 carbon atoms. The esters can be neutral esters (i.e., wherein all of the acidic-OH groups on the phosphorus oxy acid are esterified) or acid esters (i.e., esters of phosphorus oxy acids containing one or more unesterified acidic-OH groups). Examples of suitable esters are triethyl phosphate, tri-n-butyl phosphite, diphenyl phosphite, triphenyl phosphite, tricresyl phosphite, propyl phosphoric acid, and the like.

Oxides of phosphorus which are suitable for use according to the present invention are phosphorus trioxide (P$_2$O$_3$), phosphorus tetroxide (P$_2$O$_4$) and phosphorus pentoxide (P$_2$O$_5$).

Within the aforementioned four classes of phosphorus compounds suitable for use according to the present invention, namely, acids, salts, esters, and oxides, there are included other compounds such as ethyl diethylphosphinite, ethyl diethylphosphinate, diethylphosphinic acid, ethyl phosphonic acid, triethyl phosphine oxide, triphenyl phosphine oxide and the like.

The use of phosphorus compounds according to the present invention will reduce corrosion to some extent regardless of the concentration of the sulfuric acid in the aqueous solution. However, the method is most generally applicable to aqueous sulfuric acid solutions of acid pH greater than 0.01. By "acid pH" is meant a pH of up to 7.0. Preferably, the invention is applied to relatively dilute sulfuric acid solutions of pH between about 0.5 and about 3.0, or more broadly 0.01 to about 3.0.

Temperature is not a critical factor in the application of the invention. The corrosion inhibitors are, in general, less effective at high temperatures than at low temperatures but the invention is effective at temperatures in the elevated range typical of normal industrial operations, i.e., up to about 200°C. The process of this invention is effective at super-, sub-, and atmospheric pressures.

As may be seen from the foregoing, the present invention resides in the incorporation into aqueous sulfuric acid solutions of certain phosphorus compounds, with the preferred phosphorus compound being orthophosphoric acid. This corrosion-inhibiting ability is unexpected since a compound such as orthophosphoric acid is itself quite corrosive. However, it has been found that the use of very small amounts, as opposed to large quantities, of these phosphorus compounds does indeed render aqueous sulfuric acid less corrosive to metals. Furthermore, although the use of phosphorus compounds to inhibit corrosion of metals by acetic acid is known (see U.S. Pat. No. 3,416,974), it is surprising that such phosphorus compounds are also effective in suppressing corrosion by sulfuric acid, which is not only tremendously more acidic than acetic acid, but is a powerful oxidizing agent as well.

In general, the amount of phosphorus compound to be utilized is from 1 to 10,000 p.p.m. based on the weight of the aqueous sulfuric acid solution, but the preferred range is from about 100 to 5000 p.p.m. Advantageously, the phosphorus-containing additive is fed continuously into the sulfuric acid solution being treated at a rate so as to maintain therein a concentration of the desired magnitude. If desired, however, the phosphorus compound can be injected intermittently, since the action of the inhibitor has been discovered to be cumulative and, over reasonably short periods of time, comparatively irreversible. Without wishing to be bound by theory, it is believed that the inhibitor forms an adherent coating on the surface of the metal which tends to persist even when the treatment of the liquid is temporarily discontinued.

DESCRIPTION OF THE PREFERRED EMBODIMENTS

The following example is presented for the purpose of illustrating (but not limiting) the product and process of the present invention. Parts and percentages are by weight unless otherwise indicated.

EXAMPLE

Several runs were made wherein distilled water containing the desired quantity of reagent grade sulfuric acid was pumped through a heated 200 milliliter test cell. The feed rate to the cell was 50 milliliters per hour. Electrical resistance-type probes made of either Type 304 or Type 316 stainless steel were inserted into the cell and the rate of corrosion of these probes determined by standard electrometric methods. In some of the runs, varying amounts of a phosphorus compound were added to inhibit corrosion. The conditions of each of the runs and the results thereof may be seen in the following table. The corrosion rate is given in Mils per year.

TABLE

| Run No. | Probe, Type SS | Aqueous H₂SO₄ Solution, pH | Temp., °C | Inhibitor Type | ppm | Corrosion Rate, mpy* |
|---|---|---|---|---|---|---|
| 1 | 304 | 2.4 | 151 | None | | 212 |
| 2 | 304 | 2.0 | 153 | Diethylphosphite | 640 | <1 |
| 3 | 316 | 2.4 | 152 | None | | 75 |
| 4 | 316 | 2.4 | 152 | Orthophosphoric | 500 | <1 |
| 5 | 316 | 2.0 | 172 | Orthophosphoric | 500 | <5 |
| 6 | 316 | 1.5 | 150 | Orthophosphoric | 500 | 38 |
| 7 | 316 | 1.5 | 150 | Orthophosphoric | 1000 | <3 |
| 8 | 316 | 1.5 | 173 | Orthophosphoric | 500 | 140 |
| 9 | 316 | 1.2 | 153 | None | | 122 |
| 10 | 316 | 1.2 | 153 | Pyrophosphoric | 1000 | 23 |
| 11 | 316 | 1.2 | 152 | Pyrophosphoric | 5000 | 29 |
| 12 | 316 | 0.01⁽¹⁾ | 151 | None | | 1400 |
| 13 | 316 | 0.01 | 154 | Pyrophosphoric | 5000 | 780 |

⁽¹⁾ At low pH around 0.01 to 0.5, at least about 2000 ppm inhibitor is preferred.
*Mils per year.

The foregoing example illustrates that the corrosion inhibitors of the present invention greatly retard the corrosion of either Type 304 or Type 316 stainless steel by aqueous sulfuric acid solutions. The present invention however is also effective in systems containing other stainless steels such as Type 308 or Type 317. In addition to stainless steels, the present invention is effective in systems constructed of other metals such as nickel, aluminum, titanium, Carpenter 20, Hastelloy B, Hastelloy C, and the like.

We claim:

1. A method for inhibiting the corrosivity of aqueous sulfuric acid solutions towards metals, said method comprising incorporating into an aqueous sulfuric acid solution, which has a pH of between 0.01 to about 3.0, an amount ranging from 1 to 10,000 ppm of a corrosion inhibitor consisting essentially of a phosphorus compound having at least one phosphorus atom linked to an unshared oxygen atom and selected from the group consisting of oxy acids of phosphorus, salts of the oxy acids of phosphorus, esters of the oxy acids of phosphorus and oxides of phosphorus.

2. A method for inhibiting the corrosivity of aqueous sulfuric acid solutions toward metals, said method comprising incorporating into an aqueous sulfuric acid solution, which has a pH of between about 0.5 and 3.0, an amount ranging from 1 to 10,000 ppm of a corrosion inhibitor consisting essentially of a phosphorus compound having at least one phosphorus atom linked to an unshared oxygen atom and selected from the group consisting of oxy acids of phosphorus, salts of the oxy acids of phosphorus, esters of the oxy acids of phosphorus and oxides of phosphorus.

3. The method of claim 2 wherein the phosphorus compound is orthophosphoric acid or pyrophosphoric acid.

4. The method of claim 2 wherein the phosphorus compound is an alkali metal salt of orthophosphoric acid or an alkali metal salt of pyrophosphoric acid.

5. The method of claim 4 wherein the alkali metal salt of orthophosphoric acid is monopotassium orthophosphate or trisodium orthophosphate and the alkali metal salt of pyrophosphoric acid is tetrasodium pyrophosphate.

6. The method of claim 2 wherein the phosphorus compound is an alkali metal salt of orthophosphorous acid or an alkali metal salt of hypophosphorous acid.

7. The method of claim 6 wherein the alkali metal salt of orthophosphorous acid is monosodium orthophosphite and the alkali metal salt of hypophosphorous acid is sodium hypophosphite.

8. The method of claim 2 wherein said metal being inhibited is stainless steel and said phosphorus compound is orthophosphoric acid which is present in amounts of from about 100 to 5,000 ppm.

9. The method of claim 2 wherein said method is for the inhibition of corrosion of stainless steel.

10. An aqueous sulfuric acid solution with a pH of between about 0.5 and 3.0 having incorporated therein a corrosion inhibitor consisting of orthophosphoric acid in a concentration of about 1 to 10,000 ppm.

11. The solution of claim 9 wherein the orthophosphoric acid is present in amounts of from about 100 to 5,000 ppm.

12. The method of claim 1 wherein the pH is between 0.01 and about 0.5 and wherein the inhibitor is incorporated into the solution in a concentration of at least about 2,000 ppm.

* * * * *